United States Patent [19]

Martin

[11] Patent Number: 4,538,213
[45] Date of Patent: Aug. 27, 1985

[54] VEHICLE HEADLIGHT ATTACHMENT

[76] Inventor: Jessie A. Martin, 15442 Linkshire, Houston, Tex. 77062

[21] Appl. No.: 587,230

[22] Filed: Mar. 7, 1984

Related U.S. Application Data

[63] Continuation of Ser. No. 236,771, Feb. 23, 1981, abandoned, which is a continuation-in-part of Ser. No. 130,751, Mar. 31, 1980, abandoned.

[51] Int. Cl.³ .............................................. B60Q 1/00
[52] U.S. Cl. .................................... 362/61; 362/293; 362/389
[58] Field of Search .................. 362/2, 61, 80, 82, 83, 362/326, 396, 397, 293, 389

[56] References Cited

U.S. PATENT DOCUMENTS

| | | | |
|---|---|---|---|
| 2,499,555 | 3/1950 | Wronkowski | 362/293 |
| 2,668,903 | 2/1954 | Barcus | 362/293 |
| 2,734,129 | 2/1956 | Kahla | 362/293 |
| 2,807,711 | 9/1957 | McDonald | 362/293 |
| 3,696,238 | 10/1972 | Szymanski | 362/293 |
| 4,006,377 | 2/1977 | Kosmatka | 362/293 |
| 4,237,523 | 12/1980 | Moote | 362/61 |

Primary Examiner—Donald P. Walsh
Attorney, Agent, or Firm—David B. Ostheld

[57] ABSTRACT

In the preferred and illustrated embodiment, a vehicle headlight attachment is disclosed. The attachment comprises a concavo-convex surface boardered by an upstanding and circumferentially extending rim which is provided with a plurality of beads formed on the interior surface thereof for attaching the attachment to the vehicle headlight. A removable filter element mountable on the headlight attachment is also disclosed.

7 Claims, 8 Drawing Figures

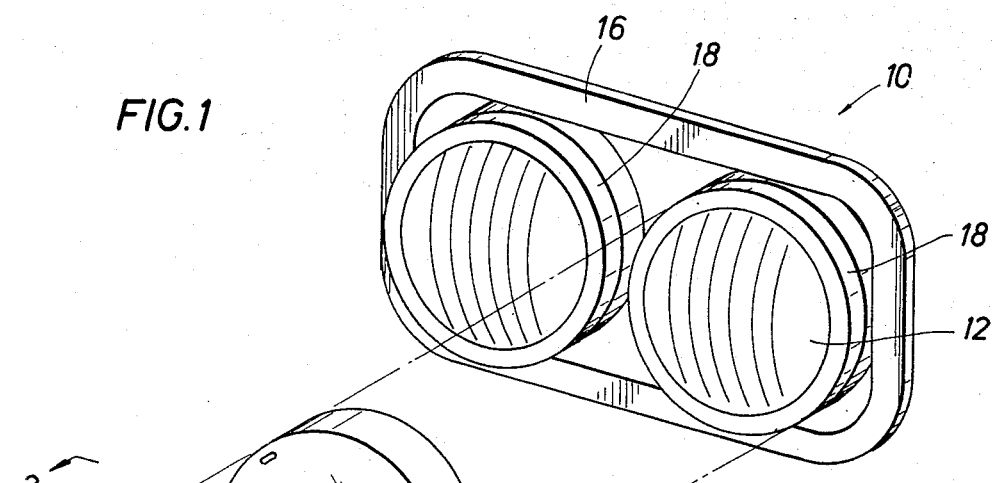
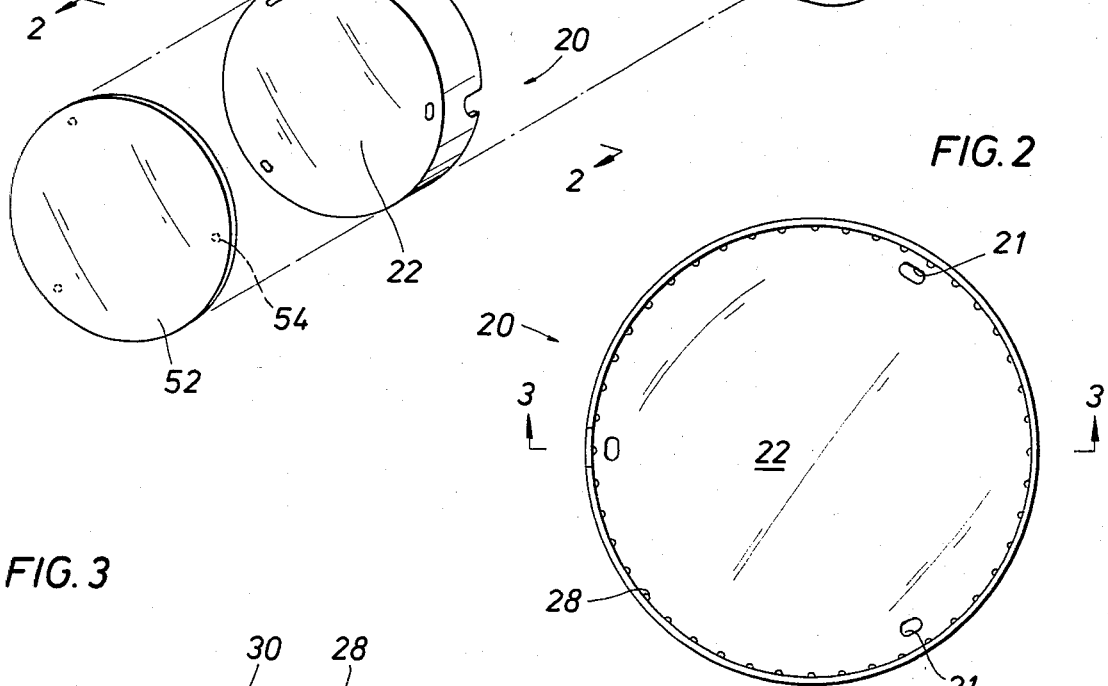
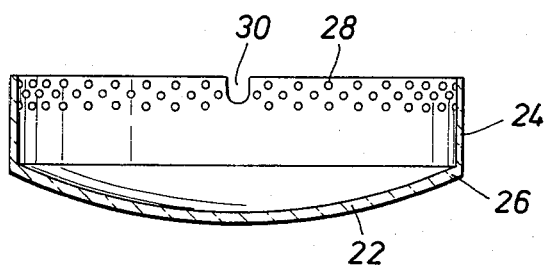
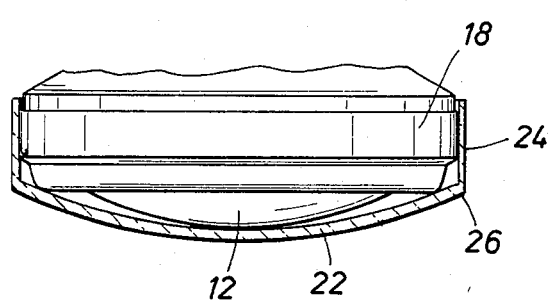
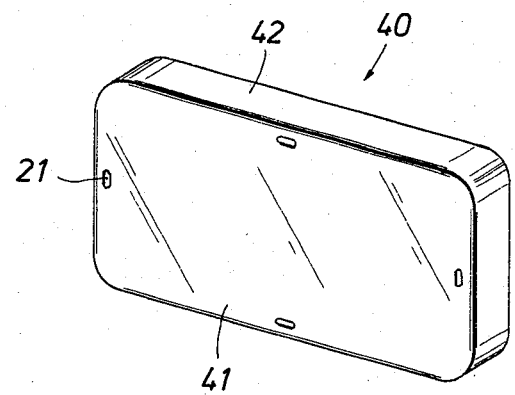

4,538,213

VEHICLE HEADLIGHT ATTACHMENT

RELATED APPLICATIONS

This is a continuation of application Ser. No. 236,771, filed Feb. 23, 1981, now abandoned, which is a continuation-in-part of application Ser. No.130,751, filed Mar. 31, 1980, now abandoned.

BACKGROUND

This invention relates to vehicle headlight attachments, particularly to an attachment which is readily attachable to or removable from the headlight of an automotive vehicle thereby providing a protective shield and converting the conventional headlight into a fog light.

It is well known that conditions of fog or rain seriously interfere with the effective use of automotive vehicle headlight systems. Frequently, the reflected glare of a light beam from the fog particles tend to blind the driver of a vehicle as well as the drivers of approaching vehicles. It is also well known that light filters of various types tend, to a large extent, to overcome this difficulty. However, the use of such light filters with conventional automobile headlights has not been too successful because of a number of factors such as the lack of ease in the application of the filters to the headlights when their use is required, the effectiveness of the filter attaching means and the like. Headlight filter attachments are disclosed in U.S. Pat. No. 2,544,374 to C. A. Cyr; U.S. Pat. No. 2,734,120 to E. B. Kahla; and U.S. Pat. No. 3,334,220 to P. T. Komiske. These patents disclose that it is well known that visibility can be improved by decreasing the intensity of the light emitted by the headlights. It is also well known that amber or yellow light is particularly advantageous during foggy or raining weather in that it permits greater intensity before the reflection and diffusion becomes unduly bothersome.

The prior art devices disclosed in the patents mentioned above have a number of drawbacks. One employs suction cups as a means for attaching the filter to the headlamp. This means of attachment is not very effective particularly when the headlamps are dirty. In another, the attaching means is a plurality of projections which are received by recesses formed in the headlamp. This type of attachment requires a special headlamp having recesses for receiving the projections, which headlamp is not in common use today. The third prior art device employs magnets for attaching the filter to the vehicle headlights. This is not a particularly convenient mode of attachment and requires that the headlight retention ring extend outwardly from the headlamp providing an attaching surface for the magnets.

The present invention overcomes the foregoing difficulties by providing an apparatus which is very simple and inexpensive in character and which may be quickly and easily attached to and detached from conventional headlamps. In addition, the present invention may also be used without the filter attachment as a protective shield for the headlamps.

SUMMARY

The present invention is directed to a vehicle headlight assembly comprising a transparent plastic shield molded for attachment about a headlight retention ring. The shield includes a concavo-convex surface boardered about its peripheral edge by an upstanding rim. A plurality of beads are formed on the internal surface of the rim for frictionally attaching the shield of the invention to a vehicle headlight assembly. In an alternate embodiment, the shield of the invention has a rectangular shape for mounting to headlight assemblies having a rectangular configuration. The vehicle headlight assembly of the present invention further includes a filter attachment which may be attached to the headlight shield during foggy and rainy weather.

It is, therefore, an object of this invention to provide a headlight attachment for protecting or shielding vehicle headlamps from road debris and for converting a conventional vehicle headlight to a fog light. This is accomplished by a feature of the invention wherein a shield attachment and a yellow-amber filter are provided for attachment to the vehicle headlamps.

It is another object of the invention to provide a shield attachment which is quickly and easily attached to and detached from a vehicle headlight. This is accomplished by a feature of the invention wherein a plurality of beads formed on the shield attachment are employed for frictionally securing the attachment to the vehicle headlight.

DETAILED DESCRIPTION OF THE DRAWINGS

So that the manner in which the above recited features, advantages and objects of the invention, as well as others, which will become apparent, are attained and can be understood in detail, a more particular description of the invention, briefly summarized above, may be had by reference to the embodiments thereof illustrated in the appended drawings, which drawings form a part of this specification. It is to be noted, however, that the appended drawings illustrate only typical embodiments of the invention and are not to be considered limiting of its scope, for the invention may admit to other equally effective embodiments.

FIG. 1 is a perspective expanded view showing a preferred embodiment of the invention;

FIG. 2 is an end view of a preferred embodiment of the invention taken along line 2—2 of FIG. 1;

FIG. 3 is a corss-sectional view of a preferred embodiment of the invention taken along line 3—3 of FIG. 2;

FIG. 4 is a corss-secitonal, partially broken away view showing a preferred embodiment of the invention mounted to a vehicle headlight;

FIG. 5 is a perspective view of an alternate embodiment of the invention;

DETAILED DESCRIPTION OF THE PREFERRED EMBODIMENT

Figure 6:
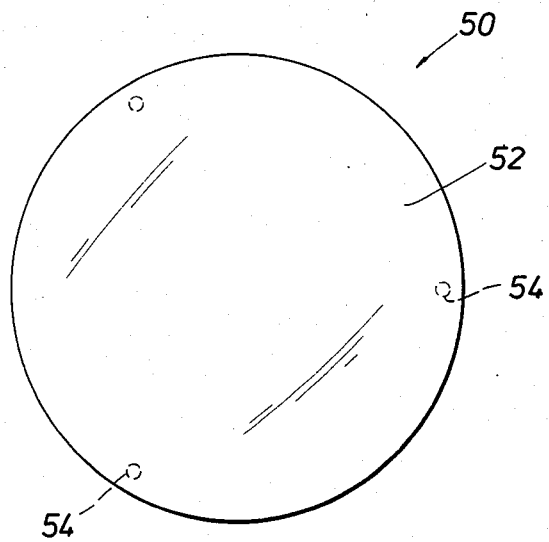
FIG. 6 is a front plain view of the filter of the invention.

Referring now to the drawings, reference numeral 10 generally designates the headlight assembly of a vehicle. The headlight assembly includes headlamps 12 of the sealed-beam type. The headlamps 12 are of conventional design and construction. The diameter and curvature of the front lens portion of the headlamps 12 is standardized for a number of vehicles. The headlight assembly 10 includes a mounting plate 16 and headlamp retention rings 18 for mounting the headlamps 12 to the vehicle. The retention rings 18 circumferentially enclose the headlamps 12 as shown in FIG. 1 and retain them in position. The headlight assembly 10 is of conventional design and well known in the art. Two headlamps 12 are shown in the drawings for illustrative purposes only. It is understood that the invention of the present application is equally applicable to headlight assemblies containing one headlamp.

Turning now to FIGS. 2 through 4 of the drawings, the shield attachment 20 of the present invention is disclosed. The shield 20 comprises a smooth, transparent surface 22 which may be circular in outline, as best shown in FIG. 2, and of a diameter corresponding to that of the standard sealed-beam lamp lens 12. The surface 22 is shaped to a concavo-convex contour upon a radius corresponding to that of the front surface of the headlamp 12. A plurality of slots 21 are formed in the surface 22 providing a plurality of openings sized to accept an equal number of tabs which protrude from the back surface of a filter element 50, to be described later herein. The openings may also receive a pry bar or the like. The pry bar may be a screwdriver blade, knife blade, coin, or any other convenient item that may be employed for prying the shield 20 from the headlamp 12.

Referring now specifically to FIG. 3, the shield 20 of the invention is shown in cross-section. An upstanding circumferential rim 24 extends about the peripheral edge 26. The rim 24 extends outwardly from the concave side of the surface 22 and is preferably one inch in height. The height of the rim 24 may vary, however, one inch is preferred for convenient attachment to a majority of vehicle headlight assemblies. The height of the headlight retention ring 18 in different vehicles may vary. Therefore, the rim 24 of the present invention is sized to accommodate a plurality of retention rings having a height and a range of one quarter inch to one inch.

It will be observed that a plurality of beads 28 are formed on the interior surface of the rim 24. The beads 28 are evenly spaced on the interior surface of the rim 24 in one or more circular rows. The number of rows may vary. Three rows are shown in FIG. 3 for illustrative purposes only. The beads 28 may be randomly spaced, however, even spacing is preferred for providing a uniform gripping force on the headlight retention ring 18. A U-shaped slot 30, open at one end, is incorporated in the rim 24 to accommodate the retention screws employed in conventional headlight assemblies for fastening the retention ring to the headlight assembly mounting. The retention screw is not shown in the drawings for the sake of clarity. Retention screws for headlight assemblies are well known in the art and are customarily employed for adjusting the position of the headlamps 12. The slot 30 is incorporated in the rim 24 for bridging over the retention screw and thus permitting the rim 24 to completely encircle the retention ring 18 as best shown in FIG. 4.

The shield attachment 20 is preferably fabricated of clear, transparent plastic material. The shield 20 is an integral piece of plastic comprising a concavo-convex surface 22 and a rim 24. The surface 22 and the rim 24 are relatively thin permitting the shield 20 to be conveniently and easily flexed inwardly and outwardly. The shield 20 may be fabricated employing permanent molds or by an injection molding process.

The shield attachment 20 may easily be mounted to a headlamp 12 to provide a protective shield about a conventional headlamp. In order to mount the shield 20, it is only necessary to apply flexing pressure to the surface 22 and simultaneously slip the rim 24 about the retention ring 18 of the headlight assembly. The shield 20 is held rigidly in place by the beads 28 which grip the circumferential surface of the retention ring 18 when the flexing pressure on the surface 22 is removed and the shield 20 resumes its molded shape. When in place, the shield 20 protects the headlamp 12 from flying rocks and other road debris.

In FIG. 5, an alternate embodiment of the shield attachment is disclosed which is generally designated by the reference numeral 40. The shield 40 is constructed in the same manner and of the same materials disclosed hereinabove in describing the preferred embodiment of FIGS. 1 through 4. Like reference numerals are employed to designate like elements. The shield 40, however, is rectangular shaped and comprises a smooth, transparent planar surface 41 bordered by an upstanding rim 42 for attachment to the rectangular shaped headlight assemblies of many vehicles.

Figure 7:
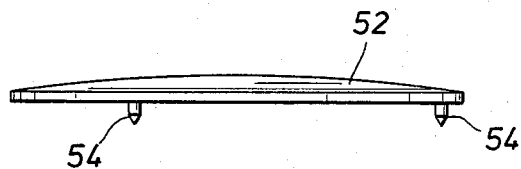
FIG. 7 is a side view of the filter of the invention.

Referring now to FIGS. 6 and 7, a filter disk 50 is disclosed. The filter disk 50 is circular and comprises a smooth transparent surface 52. The surface 52 is shaped to a concavo-convex contour as shown in FIG. 7. The diameter of the surface 52 is substantially equal to the diameter of the shield attachment 20. The filter disk 50 is provided with a plurality of anchoring tabs 54 for attaching the disk 50 to the shield 20. The tabs 54 protrude downwardly from the bottom of the surface 52 and are sized to be received in the slots 21 formed in the surface 22 of the shield attachment 20. The tabs 54 are slightly larger than the slots 21. However, the tabs 54 are fabricated of plastic material having a degree of flexibility so that the disk 50 may be conveniently mounted on the shield attachment 20 by simply forcing the tabs 54 into the slots 21.

The filter disk 50 is fabricated of a suitable plastic material which is preferably of a yellow-amber color. The disk 50 is an integral piece of plastic comprising a concavo-convex surface 52 and a plurality of tabs 54 extending from the bottom surface thereof. It may be fabricated employing permanent molds or by an injection molding process.

Figure 8:
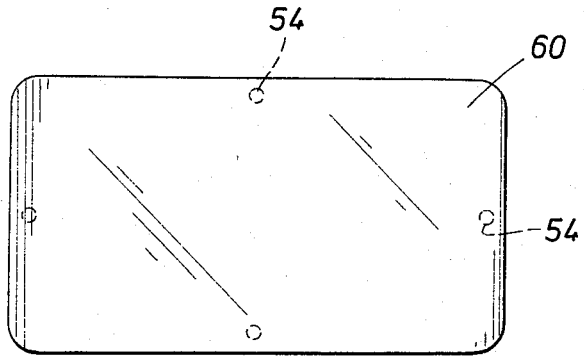
FIG. 8 is a front plain view of an alternate embodiment of the filter of the invention.

In FIG. 8, an alternate embodiment of the filter is disclosed. The filter 60 is constructed in the same manner and of the same materials disclosed hereinabove in describing the embodiment of FIGS. 6 and 7. Like reference numerals are employed to designate like elements. The filter 60, however, is rectangular shaped and comprises a planar, transparent surface for attachment to the rectangular shaped shield attachment shown in FIG. 5.

While the above described invention refers to a sealed-beam headlight as the standard type of headlight, it is contemplated that the shield and filter attachment of the present invention is attachable to any type of headlight having a retention ring.

Filtering attachments constructed in accordance with the present invention occupy very litile space and may easily be stored in a glove compartment or other convenient place in a car. When mounted to a headlight, they reduce, to some extent, the intensity of the light from the headlamps, which is desirable, without so reducing the intensity as to interfere with proper vision, while the yellow-amber tinting they impart to the light reduces the annoying effect of such diffusion and reflection as are caused by fog or rain, there by further increasing visibility.

While the foregoing is directed to the preferred embodiment of the present invention, other and further embodiments of the invention may be devised without departing from the basic concept thereof, and the scope thereof is determined by the claims which follow.

I claim:

1. A detachable lens attachment for vehicle headlights having a substantially smooth headlight rim, comprising:
   (a) a transparent surface having a diameter corresponding to the diameter of the headlight;
   (b) an upstanding circumferential rim extending outwardly from said surface and located about the peripheral edge thereof having continuously, unbroken portions; and
   (c) a plurality of beads formed on the interior surface of said continuously, unbroken portions of said rim, said beads adapted to form a friction fit with the substantially smooth headlight rim.

2. The apparatus of claim 1 wherein said transparent surface includes a concavo-convex surface.

3. The apparatus of claim 2 wherein the headlight has a retention screw and said rim includes a U-shaped slot for bridging over a retention screw.

4. The apparatus of claim 2 wherein said lens attachment further includes a removable filter element mounted on said concavo-convex surface of said lens attachment, said filter element having a diameter corresponding to the diameter of said lens attachment.

5. The apparatus of claim 4 wherein said filter element further includes a plurality of anchoring tabs protruding from a bottom surface and said concavo-convex surface further includes corresponding slots to said tabs, said tabs being received in said corresponding slots.

6. A detachable lens attachment for vehicle headlights having a substantially smooth outer surface, comprising:
   (a) a transparent surface having dimensions which are substantially equal to the dimensions of the headlight and having a peripheral edge;
   (b) an upstanding rim extending orthoginally from the plane of said peripheral edge and located about said peripheral edge, said rim having a substantially continuous surface; and
   (c) a plurality of beads formed on said interior, continuous surface of said rim, said beads forming a friction fit with the smooth outer surface of the headlight.

7. The apparatus of claim 6 wherein said lens attachment further includes a removable filter element mounted on said transparent surface, said filter element having dimensions corresponding to the dimensions of said lens attachment and further including anchoring tabs protruding from a surface of said filter element and said transparent surface having slots corresponding to said tabs, said tabs being received in said corresponding slots.

* * * * *